United States Patent [19]
Waedt et al.

[11] Patent Number: 6,012,147
[45] Date of Patent: Jan. 4, 2000

[54] METHOD FOR DETERMINING A RELIABILITY PARAMETER OF A RESPONSIVE SYSTEM, AND A CORRESPONDING SIGNAL PROCESSING SYSTEM

[75] Inventors: Karl Waedt, Erlangen; Werner Schulze, Hoechstadt, both of Germany

[73] Assignee: Siemens Aktiengesellschaft, Munich, Germany

[21] Appl. No.: 08/926,718

[22] Filed: Sep. 10, 1997

Related U.S. Application Data

[63] Continuation of application No. PCT/DE96/00383, Mar. 4, 1996.

[30]    Foreign Application Priority Data

Mar. 10, 1995 [DE] Germany ............................ 195 08 720

[51] Int. Cl.$^7$ .................................................. G06F 11/00
[52] U.S. Cl. ............................................................ 714/1
[58] Field of Search .............................. 395/180, 183.01, 395/183.09, 183.13, 183.15, 185.01

[56]    References Cited

U.S. PATENT DOCUMENTS

| | | | |
|---|---|---|---|
| 5,014,220 | 5/1991 | McMann et al. ...................... | 364/513 |
| 5,469,445 | 11/1995 | Nicolaidis .............................. | 371/22.3 |
| 5,490,249 | 2/1996 | Miller .................................. | 395/183.15 |
| 5,513,312 | 4/1996 | Loebig ................................ | 395/182.01 |
| 5,581,694 | 12/1996 | Iverson et al. ..................... | 395/183.02 |

FOREIGN PATENT DOCUMENTS 0 416 370 A2  3/1991  European Pat. Off. .

OTHER PUBLICATIONS

"Large Scale Integration: technology, applications and impacts" (Lawson et al.), fourth Euromicro symposium on microprocessing and microprogramming, Oct. 17–19, 1978, Munich, pp. 159, 175–183.

"Validating Data from Smart Sensors" (Manus Henry), 699 Control Engineering 41, Aug. 1994, No. 9, Newton, MA, US, pp. 63–66.

*Primary Examiner*—Robert W. Beausoliel, Jr.
*Assistant Examiner*—Scott T. Baderman
*Attorney, Agent, or Firm*—Herbert L. Lerner; Laurence A. Greenberg

[57]    ABSTRACT

A method and a responsive system for signal processing, particularly a system of the safety instrumentation and control of a nuclear power plant. A first database stores the association of the data processing units, data transmission units, and computer programs of the system, as well as a sequence of steps in the automatic signal processing in accordance with an integral processing specification. A second database stores in memory operating parameters and at least one reliability parameter of each data processing unit and each data transmission unit. The contents of the databases are utilized in a reliability module, which determines the reliability characteristic of the responsive system from the data of the first database and the second database. If and when the reliability parameters change, a transmission takes place to the reliability module, so that in each case an updated reliability parameter may be determined. As a result, the currently valid availability of the responsive system can be learned at any point in time, taking into account the high degree of detailing of the system.

9 Claims, 2 Drawing Sheets

METHOD FOR DETERMINING A RELIABILITY PARAMETER OF A RESPONSIVE SYSTEM, AND A CORRESPONDING SIGNAL PROCESSING SYSTEM

CROSS-REFERENCE TO RELATED APPLICATION

This is a continuation of copending international application PCT/DE96/00383, filed Mar. 4, 1996, which designated the United States.

BACKGROUND OF THE INVENTION

Field of the Invention

The invention relates to a responsive system for signal processing, which for an input signal state generates an unambiguous output signal state; the system has a plurality of data processing units, which communicate with one another via data transmission units, and on which modularly constructed computer programs are implemented. The invention also relates to a method for determining a reliability parameter of a responsive system.

A responsive system, i.e., an error-tolerant and real-time-capable system for signal processing, finds manifold uses in the context of an industrial automation process. Of particular significance is a responsive system in an automation process in which predetermined time limits must be observed, or the production of demanded output signals within predetermined time intervals. Such demands often arise in production processes, closed-loop and open-loop control processes, and monitoring processes. An example is the safety instrumentation and control system of a nuclear power plant. Observing time limits or time intervals depends decisively on the operability of the individual, in particular equipment-specific, components. In the complex system, in which data processing units are connected to one another to make a large data network, errors in individual components, in the presence of an input signal state, can lead to an erroneous output signal state. For existing signal processing systems, a reliability analysis is therefore often performed, on the basis of the input signal states to be taken into account for the system.

Special demands, which are listed in so-called demand and documentation units, are made of a system for signal processing in the safety instrumentation and control system (safety I & C) of a nuclear power plant. In such a unit, a plurality of disjunctive process control segments are combined in terms of safety aspects. Examples of such units are the so-called I & C functions, which indicate a model for signal processing in the safety I & C with a formal documentation hierarchy. For the safety I & C in a pressurized water reactor, the special demands are predetermined by up to 153 different I & C functions. Of particular significance for the safety I & C of a nuclear power plant is knowledge of the availability of individual I & C functions, converted in the system by means of data transmission units, data processing units, and open-loop and closed-loop control units, as well as the availability of certain combinations of I & C functions.

Of particular interest here is the knowledge of how the failure of individual components affects the availability of the I & C responsive system. Possible failures that can be taken into account in ascertaining availability are as follows:
a single sensor (signal detection unit), and hence a single signal, fails;
an input or output component group and hence a group of signals fails;
a computer (data processing unit), which represents a node in the data network, fails;
a communications processor fails; that is, certain signals can neither be sent nor received; and
all the computers in a room or in a building fail, for instance because of a fire.

For determining the availability of a responsive system for signal processing, the system is partially examined, using mathematical analysis methods and taking into account the possible failures of components. Failures can be evaluated by the error tree method, Markov chains, generalized stochastic Petri networks, and so-called renewable processes. The availability of the system can be quantified by an unambiguous reliability parameter; the above methods can be implemented manually only by making conservative simplifications and estimates. Proving the reliability of an interlinked system in the safety I & C is done by determining the reliability of individual representative, sufficiently complex and significant tripping signals, which initiate appropriate safety measures in the event of an accident. One example of such a tripping signal is the signal that is tripped in an accident involving a loss of core coolant, upon a switchover from flooding of the reactor pressure vessel to a cooling mode via the reactor sump. In the reliability analysis, in an existing system or in other words a posteriori, the definitive portion of the signal in which the tripping signal is generated is determined; the hardware contained in it and the associations (interlinkage) of the hardware, such as sensors, data transmission units, data processing units, etc. are determined. The influence of further parts of the system (such as the ventilation system) can be estimated, excluded by definition and optionally represented in simplified form. For the components (hardware) of the definitive part, such as data input units and data output units, data processing units, monitoring units, and voters, the respective interaction and an applicable failure probability are determined (experimentally, theoretically). These failure probabilities are approximately in a range from $1 \cdot 10^{-7}$/h to $1 \cdot 10^{-4}$/h. Error probabilities due to systematic errors that are latent in the computer programs used, the hardware used, data structures provided for joint access to computer programs and/or hardware, and caused by error-causing events (such as fire, etc.), are associated with the failure probabilities. The interlinkage of the components of the definitive part is worked out by mathematical linkage operations and delivered together with the failure probabilities, optionally in a simplified structure, to an evaluation program. Such an evaluation program can for instance be the risk spectrum PSA program made by Recon AB in Sweden, which by the error tree method furnishes a conservative estimate of the unavailability (failure probability) for the corresponding tripping signal. For the tripping signal described as an example above, this unavailability is approximately $1 \cdot 10^{-3}$. A reliability parameter ascertained in this way is as a rule overly conservative and only limitedly takes into account the more-detailed structure of the responsive system, and as a result, even a breakdown of the contribution of individual components to the unavailability is possible only in broad strokes.

SUMMARY OF THE INVENTION

It is accordingly an object of the invention to provide a method for determining a reliability parameter of a responsive system, in particular a safety I & C in a nuclear power plant, and a corresponding signal processing system, which overcomes the above-mentioned disadvantages of the prior art devices and methods of this general type.

With the foregoing and other objects in view there is provided, in accordance with the invention, a method of determining a reliability variable of a responsive system for signal processing, wherein the system includes a plurality of data processing units communicating with one another via data transmission units, the method which comprises:

implementing in the data processing units computer programs constructed modularly from a number of function components;

processing with the data processing units input signals of an input signal state, in accordance with a given sequence of steps (stored in memory) specified by an integral processing specification, and generating an unambiguous output signal state;

providing a reliability module and processing therewith the given sequence of steps in reverse order, for determining combinations of error functions and/or failures of the data processing units and/or data transmission units which lead to a valid output signal state; and linking the results of the determining step with respective reliability parameters (stored in memory) of each data processing unit and of each data transmission unit, and determining therefrom the reliability variable of the responsive system.

In accordance with an added feature of the invention, the method further comprises, after each change in the processing specification, in particular of the data processing units and data transmission units, updating the database in which the sequence of steps is stored and repeating the step of determining the reliability variable of the responsive system.

In other words, the objects of the invention are satisfied with the claimed method for determining a reliability characteristic of a responsive system for signal processing, which for an input signal state—in accordance with a sequence of steps specified by an integral processing specification—generates an unambiguous output signal state. The responsive system thereby has a plurality of data processing units, which communicate with one another through data transmission units. Computer programs are implemented on the data processing units which are constructed modularly from a number of function components. The sequence of steps stored in a database in accordance with the processing specification is processed in reversed order in a reliability module, such that the combinations of error functions and/or failures of the data processing units and/or data transmission units are determined, which lead to a valid output signal or output signal state, and from the number of total combinations—taking into account the reliability parameters, stored in a second database, of each data processing unit and each data transmission unit—the reliability parameter of the responsive system is determined. Once the reliability parameter has been determined, it may be integrated into the further signal processing, it may be displayed, or utilized in any way beneficial to the system.

By means of the integral processing specification, in which both the unambiguous association of the data processing units, data transmission units and computer programs and the sequence of automatic signal processing are stored, the structure of the responsive system is stored, in true detail, in the first database. From the structure, with knowledge of the individually used components of the responsive system, an automatic reliability analysis of the complete responsive system is done with a high degree of detail; the operating characteristics assure that the currently used processor, the version number of the applicable computer program, etc., will be indicated. The determination of a reliability parameter for the responsive system is done in the reliability module; automatic access to the necessary data in the first database and the second database is possible, and an analysis taking into account the stored reliability parameters of the individual data processing units and data transmission units is done in such a way that up to a previously defined degree of detail, all the possible combinations of errors and failures in the data processing units and data transmission units that, in the presence of an input signal state, lead to a valid output signal, are taken into account. For a detail I & C function, a software specification or a specification of the computer programs and a hardware specification, or a specification of the data processing units and data transmission units, is made automatically, and dividing up of the I & C functions into individual hardware and/or software components to be examined for reliability is effected entirely automatically. In addition, from the variables stored in the first database and the second database, all the relevant data for input into an already existing computer program can be furnished for the reliability analysis, in which an error tree analysis is for instance implemented. These data can also be supplied to the computer program completely automatically. On the basis of the formal processing specification and the indication of all the data processing units and data transmission units, for each of which its own reliability parameter is stored in memory, a determination is made of the reliability parameter of the responsive system, or of an I & C function, or of a portion of this I & C function, with a very high degree of detail.

By way of example, the applicable reliability parameter of the data processing unit or data transmission unit also takes into account such time indications as the mean repair time for the unit or for an elementary component of the unit. Thus a mean availability of the responsive system can be determined especially simply. The second database also includes, for each function component, an unambiguous indication, for instance in the form of a formal description, of how high the reliability is that an output signal associated with an input signal applied to the function component will be created. It also includes which input signals of the applicable function component an active status processing is being performed for. By way of example, this means that if a hardware component (such as an input component group) used to realize the function component fails, an error status is set in the signal, as a result of which the function component with active status processing will execute a different algorithm than if the error status were not present. This leads to a different output signal, which for instance is a default signal, which is not critical in the context of the safety I & C.

In addition, in the determination of the reliability parameter, errors of association in the specification of the individual data processing units and data transmission units and also the computer programs based on the integral processing specification, which is taken into account in the automatic preparation of the computer programs, are precluded. Moreover, reliability parameters of individual equipment-specific elements of the responsive system, such as star coupler component groups, sensors, transceivers and communications processors, can be combined by means of a partial reliability module, thus making a subsequent (graphic) display of the reliability analysis simpler and easier to understand.

The method is especially suitable for determining a reliability parameter of a responsive system or an I & C function in a safety I & C system of a nuclear power plant. In extreme detail, it detects and takes into account the structure of the responsive system as well as the possible failures of the data processing units and data transmission units used in it. Compared with known methods, in which manual evaluation and association within the responsive system is necessary, the method is distinguished by an automatic, error-free association within the responsive system. Moreover, the degree of detail in the reliability analysis attains a depth not achievable using manual methods.

With the method, the first database is preferably updated after each change in the processing specification, especially of the data processing units and data transmission units. From the operating characteristics stored and current in the second database and from at least one reliability parameter of each data processing unit and each data transmission unit, and from the updated data of the processing specification of the first database, the reliability parameter of the responsive system or of an I & C function or of part of an I & C function is redetermined. As a result, after any change in the responsive system, the current availability of the responsive system can be indicated, which is advantageous especially in a safety I & C system of a nuclear power plant.

With the above and other objects in view there is further provided, in accordance with the invention, a responsive system for signal processing, comprising:

a plurality of data processing units and a plurality of data transmission units connecting the data processing units, the data processing units having implemented therein computer programs modularly constructed of a number of function components;

a) a first database with data stored therein concerning an association of the data processing units, the data transmission units, and the computer programs with one another and a sequence of steps in the automatic signal processing in accordance with an integral processing specification;

b) a second database with data stored therein concerning operating parameters and at least one reliability parameter of each data processing unit and of each data transmission unit; and c) a reliability module connected to the first database and to the second database, the reliability module being programmed to determine a reliability variable of the responsive system from the reliability parameters of the second database and taking into account combinations of error functions of the data processing units and the data transmission units.

In accordance with a concomitant feature of the invention, there is provided a monitoring module programmed to detect any change in the reliability parameters, in particular from a change in at least one of the data processing units, the data transmission units, and the function components, and to deliver the change to the reliability module for determining an updated reliability characteristic.

In other words, the responsive system for signal processing, which generates an unambiguous output signal state for an input signal state and which has a plurality of data processing units communicating with one another via data transmission units and in which computer programs are implemented that are constructed modularly from a number of function components, comprises the following additional components:

the first database, in which the association of the data processing units, data transmission units and computer programs with one another and the sequence of steps in the automatic signal processing are stored in memory in accordance with an integral processing specification in particular the detailing of the hardware and software components;

the second database, in which operating parameters and at least one reliability parameter of each data processing unit and each data transmission unit are stored in memory; and the reliability module, which is connected to the first database and the second database, for determining a reliability characteristic of the responsive system from the reliability parameters of the second database, taking into account combinations of error functions (failures) of the data processing units and data transmission units, which lead to an erroneous output signal state.

The monitoring module detects any change in the reliability parameters, especially from a change in the data processing units, data transmission units and/or function components, and delivers it to the reliability module for determining an updated reliability characteristic. As a result, any time the responsive system changes, the current reliability parameter of the system, or of the I & C functions associated with it, are indicated.

Other features which are considered as characteristic for the invention are set forth in the appended claims.

Although the invention is illustrated and described herein as embodied in a method for determining a reliability parameter of a responsive system, and corresponding system for signal processing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENT

Figure 1:
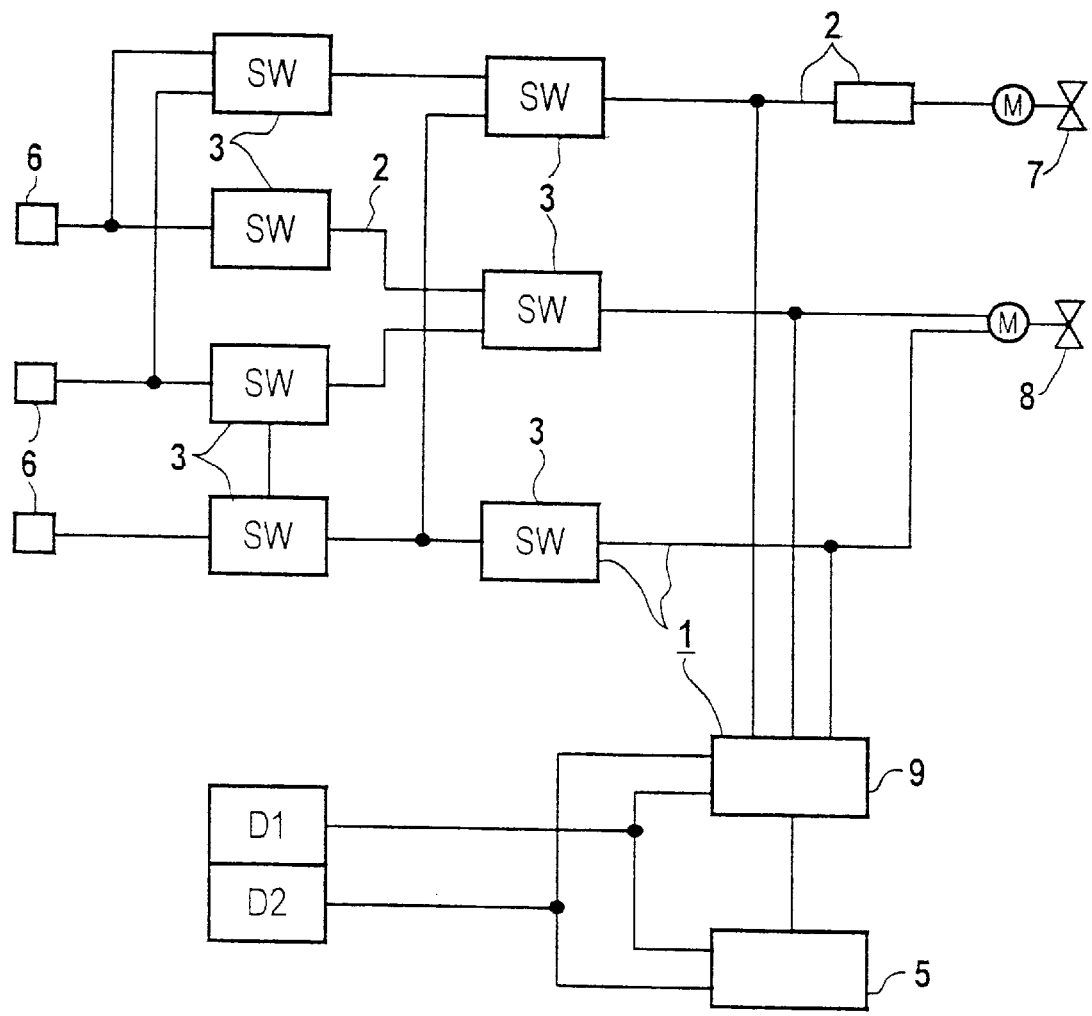
FIG. 1 is a schematic layout diagram of a responsive system.

The responsive system 1 schematically shown in FIG. 1 has a plurality of data processing units 3, which communicate with one another via data transmission units 2. The data transmission units 2 are standardized transmission lines, such as coaxial ethernet cables or similar cables, and also-standardized transmission elements, such as amplifiers, repeaters, or bridges. An input signal state is supplied to the data processing units 3 via signal generating elements 6. The signal generating elements 6 or signal sources 6 are, by way of example, measurement sensors. In FIG. 1, for the sake of simplicity, only three such signal generating elements 6 are shown. In the context of an I & C system, in particular a a safety instrumentation and control system of a nuclear power plant (for instance in signal processing for the pressure reservoir infeed in a pressurized water reactor), many such signal generating elements are disposed at various locations, which are sometimes far apart from one another, for instance in a reactor pressure vessel. The data processing units 3 are connected with the data transmission units 2 to make a computer network, to which a reliability module 5 and a monitoring module 9 as well as databases D1 and D2 are connected. The responsive system 1 is connected to closed-loop control elements 7 and open-loop control elements 8. These closed-loop control elements 7 and open-loop control elements 8 are for instance motor-controlled valves, which in an open state lead to a pressure relief of pipelines through which there is a flow. An output signal (control signal) is forwarded to the closed-loop control elements 7 and open-loop control elements 8, only one of each of which is shown for the sake of simplicity, by the responsive system. The signal generating elements 6, with a fixed period, output an applicable current input signal state to the responsive system 1, which no later than within a maximum execution time determines the output signal from this and transmits it to both the closed-loop control elements 7 and the open-loop control elements 8. In each data transmission unit 3, computer programs SW are implemented, which are constructed modularly from a number of elementary function components.

The database D1 includes the association of the data processing units 3, data transmission units 2 and computer programs SW with one another as well as the sequence of steps in signal processing in accordance with an integral unitary processing specification. The database D2 contains operating characteristics of the data processing units 3 and data transmission units 2, the model, version number, technical specifications, processor type and other data, as well as a reliability parameter for each. The determination of a reliability parameter of the responsive system or of a part of the responsive system, for instance of an I & C function in the context of the safety I & C system of a pressurized water reactor, takes place in the reliability module 5 on the basis of the reliability parameters of the second database D2 and the processing specification stored in the database D1. The combinations of malfunctions and/or failures of the data processing units 3 and data transmission units 2 are also taken into account which, in the presence of an input signal state, lead to an erroneous output signal state (such as a valid tripping signal). This reliability module 5 is connected for that purpose to the first database D1 and the second database D2; naturally, the databases D1, D2 can also be combined in a single database. Changes in the reliability parameters, especially from changes in the processing specification and/or operating characteristics of the data processing units 3, data transmission units 2, and/or computer programs SW, are detected in the reliability module 5, for instance directly transmitted from the responsive system 1 or input by a non-illustrated input device. This change in the reliability parameters is transmitted by the monitoring module 9 to the reliability module 5, so that in the latter, an updated reliability parameter for the responsive system 1 or a partial system is determined. As a result, an unambiguously quantified reliability parameter for the current responsive system 1 involved exists, and thus the availability of the actually present system, used in particular for the safety I & C system of a pressurized water reactor, is known.

Figure 2:
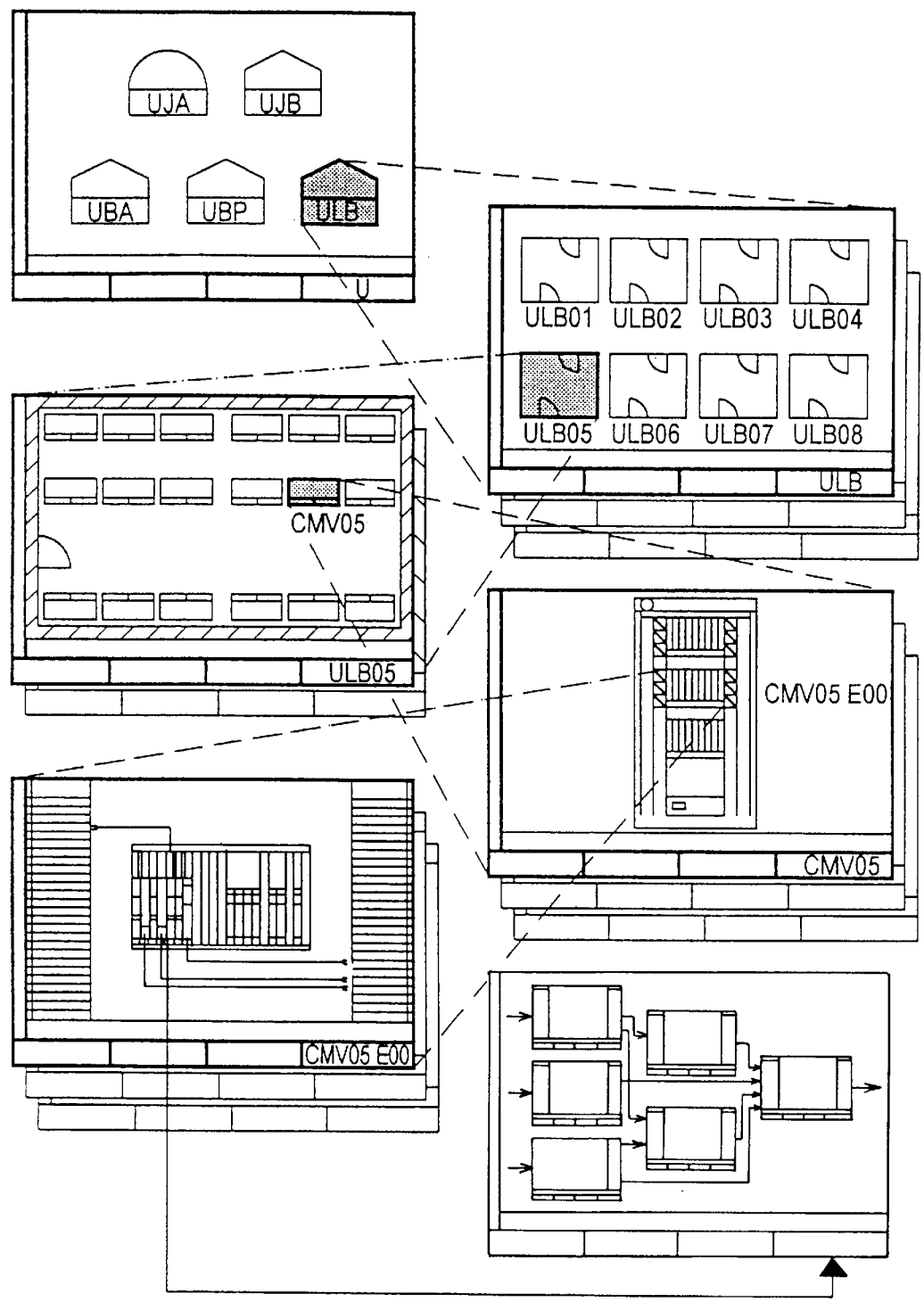
FIG. 2 is a schematic overview of the three-dimensional distribution of the components of the responsive system.

FIG. 2 shows an association and subdivision of computer programs and data processing units in a responsive system of the safety I & C system of a nuclear power plant. The responsive system includes sensors, data processing units, and data transmission units, which are distributed among five buildings of a nuclear power plant (UJA, UJB, UBA, UBP, ULB).

As shown in FIG. 2 the data processing units used for performing the I & C functions are divided up three-dimensionally. The I & C function ULB intended for the entire power plant block is subdivided into building-specific components ULB01–ULB08. These are in turn subdivided into components that are accommodated in individual rooms. In each of these rooms, the components of the system are further subdivided into cabinets in which corresponding component group holders are arranged, which in the final analysis, as the smallest units in the system, have computer programs or analogous circuits in the form so-called function component groups. By means of this local hierarchical subdivision of the system that converts the I & C function, an unambiguous linkage and association exists between the computer program and the data processing unit. As a result, for each level of this hierarchy, a reliability parameter can be determined and indicated, and from that the reliability parameter of the I & C function and of the entire responsive system can be determined unambiguously and without error.

The invention is distinguished by a responsive system for which a quantitative reliability parameter is determined unambiguously and with a high degree of detail. The determination of the reliability parameter is done on the basis of the reliability parameters stored in memory for the data processing units and data transmission units used in the responsive system as well as taking into account the unambiguously predetermined association of the units with one another. The reliability parameter of the responsive system or of a part of the system, in particular of an I & C function, is ascertained fully automatically. Any change in the responsive system can also be detected fully automatically and thus the associated reliability parameter can be indicated for whichever current version of the responsive system is being used. As a result, the current valid availability of the responsive system is available taking into account the high degree of detail of the system, which is especially advantageous for industrial plants, such s nuclear power plants, that make high demands in terms of safety technology. Because of this procedure based entirely on a formal specification with unambiguous associations, what in practice is a difficult validation of the modeling of computer programs and data processing units and data transmission units as well as open-loop control elements and closed-loop control elements, on which the responsive system is based, can be omitted.

We claim:

1. A method of determining a reliability variable of a responsive system for signal processing, wherein the system includes a plurality of data processing units communicating with one another via data transmission units, the method which comprises:

implementing in the data processing units computer programs constructed modularly from a number of function components;

processing with the data processing units input signals of an input signal state, in accordance with a given sequence of steps specified by an integral processing specification, and generating an unambiguous output signal state;

providing a reliability module and processing therewith the given sequence of steps in reverse order, for determining combinations of error functions and/or failures of the data processing units and/or data transmission units which lead to a valid output signal state; and linking the results of the determining step with respective reliability parameters of each data processing unit and of each data transmission unit, and determining therefrom the reliability variable of the responsive system.

2. The method according to claim 1, wherein the given sequence of steps is stored in a first database, the respective reliability parameters are stored in a second database, and the first and second databases are connected to the reliability module.

3. The method according to claim 2, which comprises, after each change in the processing specification, updating the first database and repeating the step of determining the reliability variable of the responsive system.

4. The method according to claim 2, which comprises, after each change in the processing specification of the data processing units and data transmission units, updating the first database and repeating the step of determining the reliability variable of the responsive system.

5. The method according to claim 1, which comprises, after each change in the processing specification, repeating the step of determining the reliability variable of the responsive system.

6. The method according to claim 1, which comprises, after each change in the processing specification of the data processing units and data transmission units, repeating the step of determining the reliability variable of the responsive system.

7. A responsive system for signal processing, comprising: a plurality of data processing units and a plurality of data transmission units connecting said data processing units, said data processing units having implemented therein computer programs modularly constructed of a number of function components;

a) a first database with data stored therein concerning an association of said data processing units, said data transmission units, and the computer programs with one another and a sequence of steps for automatic signal processing in accordance with an integral processing specification;

b) a second database with data stored therein concerning operating parameters and at least one reliability parameter of each data processing unit and of each data transmission unit; and c) a reliability module connected to said first database and to said second database, said reliability module being programmed to determine a reliability variable of the responsive system from the reliability parameters of said second database and taking into account combinations of error functions of said data processing units and said data transmission units.

8. The responsive system according to claim 7, which further comprises a monitoring module programmed to detect any change in the reliability parameters, and to deliver the change to said reliability module for determining an updated reliability characteristic.

9. The responsive system according to claim 7, which further comprises a monitoring module programmed to detect any change in the reliability parameters from a change in at least one of said data processing units, said data transmission units, and the function components, and to deliver the change to said reliability module for determining an updated reliability characteristic.

* * * * *